(12) United States Patent
Lee et al.

(10) Patent No.: US 11,067,807 B2
(45) Date of Patent: Jul. 20, 2021

(54) SMART GLASSES

(71) Applicant: Chiun Mai Communication Systems, Inc., New Taipei (TW)

(72) Inventors: Kwang-Pi Lee, New Taipei (TW); Chi-An Chen, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 12 days.

(21) Appl. No.: 16/441,720

(22) Filed: Jun. 14, 2019

(65) Prior Publication Data

US 2019/0384064 A1   Dec. 19, 2019

(30) Foreign Application Priority Data

Jun. 15, 2018   (CN) .......................... 201810621687.9

(51) Int. Cl.
```
G02B 27/01    (2006.01)
G02C 11/00    (2006.01)
G06F 1/16     (2006.01)
G06F 3/01     (2006.01)
```
(52) U.S. Cl.
CPC .......... *G02B 27/0172* (2013.01); *G02C 11/10* (2013.01); *G06F 1/163* (2013.01); *G06F 3/011* (2013.01); *G02B 2027/014* (2013.01); *G02B 2027/0178* (2013.01)

(58) Field of Classification Search
CPC ..... G02B 27/0172; G02C 11/10; G06F 1/163; G06F 3/011
See application file for complete search history.

(56) References Cited

U.S. PATENT DOCUMENTS

| | | | |
|---|---|---|---|
| 10,190,746 B1* | 1/2019 | Mao | F21V 5/04 |
| 10,775,616 B1* | 9/2020 | Ouderkirk | G06F 3/013 |
| 2013/0143115 A1* | 6/2013 | Sun | H01M 4/0471 |
| | | | 429/209 |
| 2015/0281599 A1* | 10/2015 | Slaby | H04N 5/265 |
| | | | 348/164 |
| 2016/0276326 A1* | 9/2016 | Natarajan | H01L 31/18 |
| 2019/0385990 A1* | 12/2019 | Chen | H02S 20/30 |

FOREIGN PATENT DOCUMENTS

| | | |
|---|---|---|
| CN | 103593051 A | 2/2014 |
| CN | 106610538 A | 5/2017 |
| CN | 107122057 A | 9/2017 |
| CN | 107644887 A | 1/2018 |

\* cited by examiner

*Primary Examiner* — Fred Tzeng
(74) *Attorney, Agent, or Firm* — ScienBiziP, P.C.

(57) ABSTRACT

Smart glasses taking a proportion of power it requires from ambient light includes a plurality of lenses, a frame structure connected to the plurality of lenses, a display module disposed in at least one of the plurality of lenses, a battery disposed in the frame structure, and a processor electrically connected to the display module and the battery. The display module includes display units arranged in a matrix. Each display unit comprises at least one micro LED unit, and at least one first optical photoelectric conversion unit for converting solar energy into electrical power. The battery is electrically connected to the display module.

12 Claims, 6 Drawing Sheets

SMART GLASSES

FIELD

The subject matter herein generally relates to smart glasses.

BACKGROUND

Smart glasses may include a headset and a frame. The frame includes a plurality of electronic elements, such as a camera, a display module, a processor, a BLUETOOTH module, and so on. The electronic elements are powered by a battery. Power consumption by the electronic elements is typically high, a smaller battery size with high power capacity may be hard to achieve. Further, a connector is provided for connecting the battery (e.g., remotely) and the electronic elements in the frame. Over a long period of time, a poor connection may develop.

SUMMARY

The application provides smart glasses taking a proportion of the electrical power it requires from ambient light. The smart glasses include a plurality of lenses, a frame structure connected to the plurality of lenses, a display module disposed in at least one of the plurality of lenses, a battery disposed in the frame structure, and a processor electrically connected to the display module and the battery. The display module includes display units arranged in a matrix. Each display unit comprises at least one micro LED unit, and at least one first optical photoelectric conversion unit for converting solar energy into electrical power. The battery is electrically connected to the display module.

Thus, there is room for improvement in the art.

BRIEF DESCRIPTION OF THE FIGURES

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

The present disclosure provides smart glasses with a function of emitting infrared light.

Figure 1:
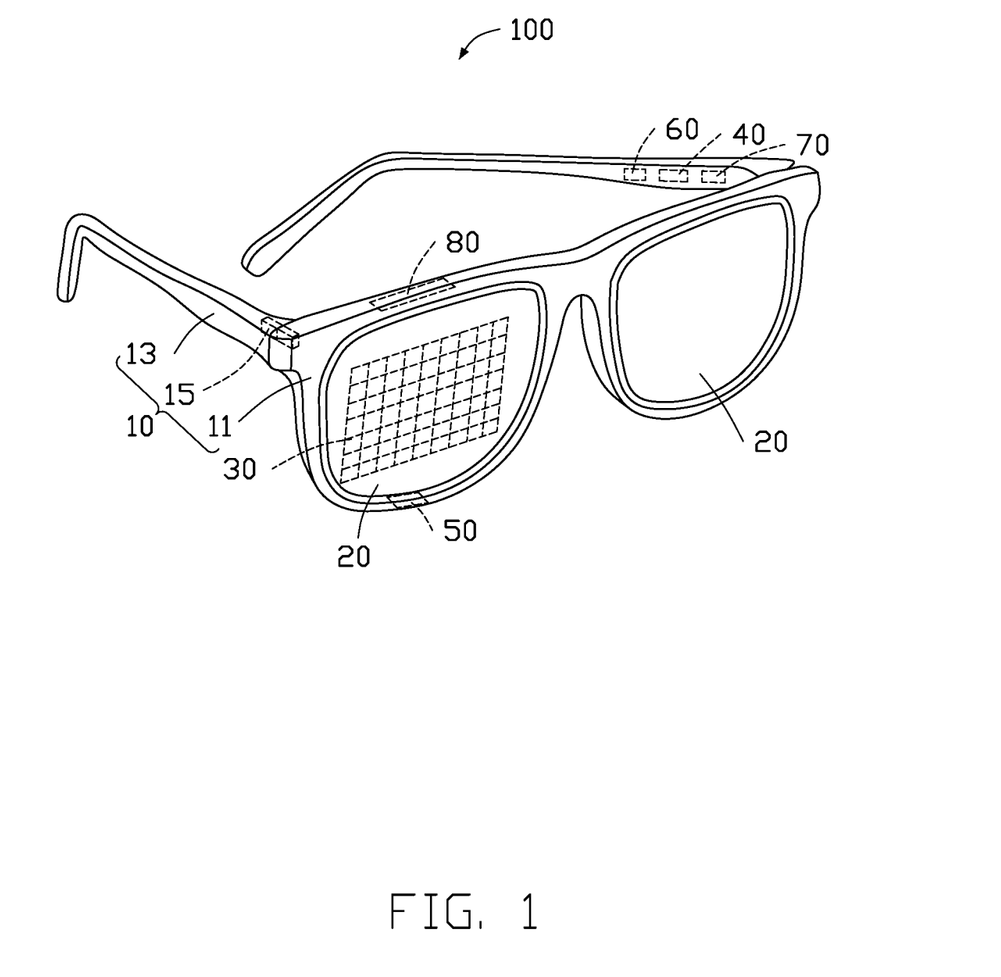
FIG. 1 is a diagram illustrating an embodiment of a pair of smart glasses, the smart glasses include display modules, and each display module includes display units.

FIG. 1 shows a pair of smart glasses 100. The smart glasses 100 include a frame structure 10, two lenses 20 fixed on the frame 10, a display module 30, a processor 40, a battery 50, a battery control module 60, and a filter control module 70.

In one embodiment, the frame structure 10 includes a frame 11, two arms 13, and two connection portions 15. The lenses 20 are fixed in the frame 11. The arms 13 are rotatably connected to the frame 11 through the connection portions 15. In one embodiment, the connection portions 15 can be spring hinges.

Figure 3:
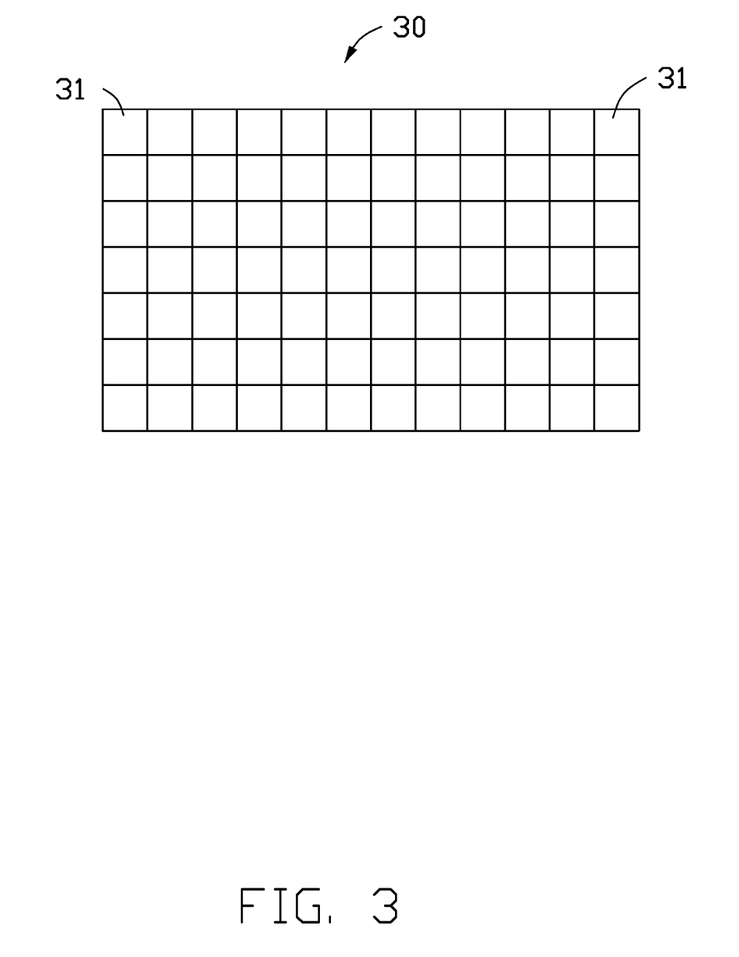
FIG. 3 is a diagram illustrating of the display modules of FIG. 1.

FIG. 3 shows the display module 30 in a planar view. The display module 30 is disposed in at least one of the lenses 20. The display module 30 includes a plurality of display units 31 arranged in a matrix.

Figure 4:
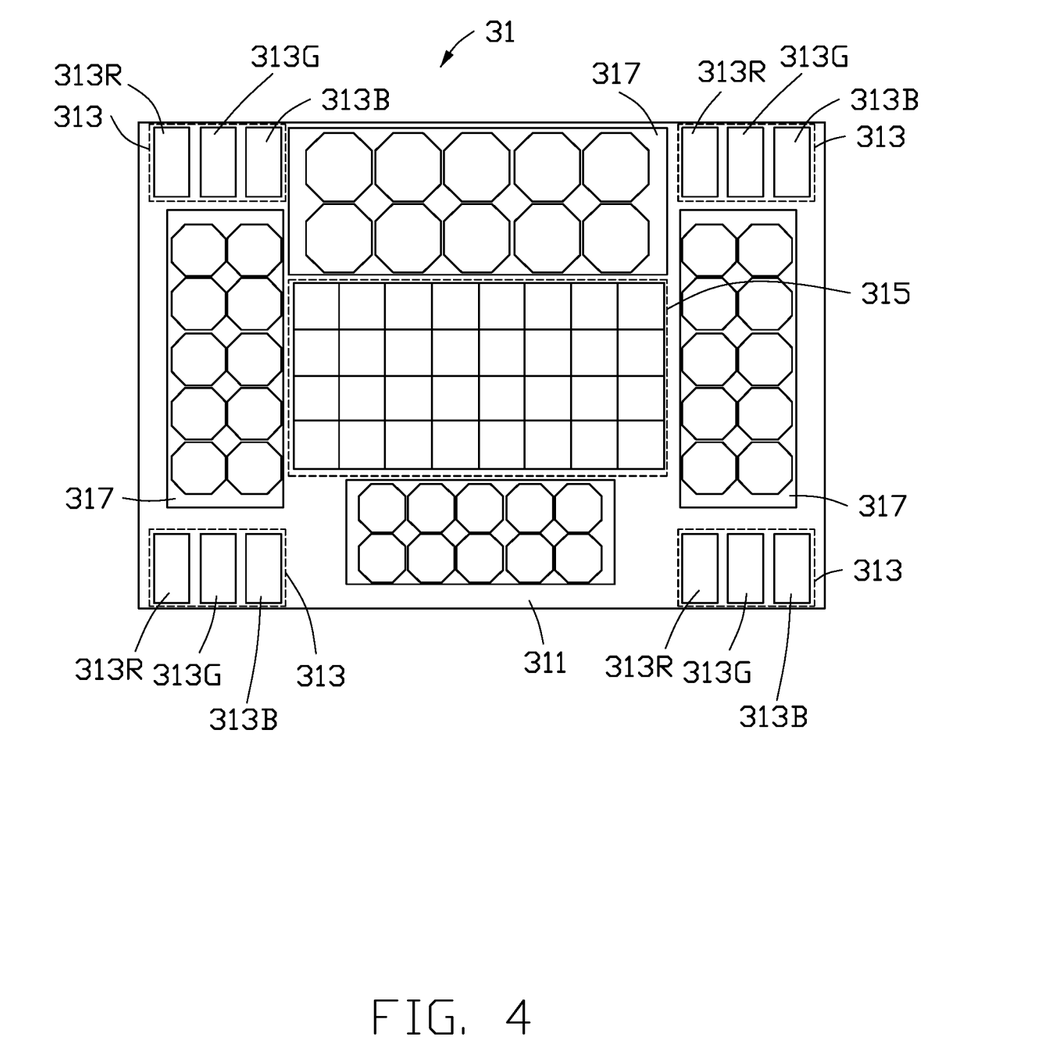
FIG. 4 is a planar view of a first embodiment of the display units of FIG. 3.
Figure 5:
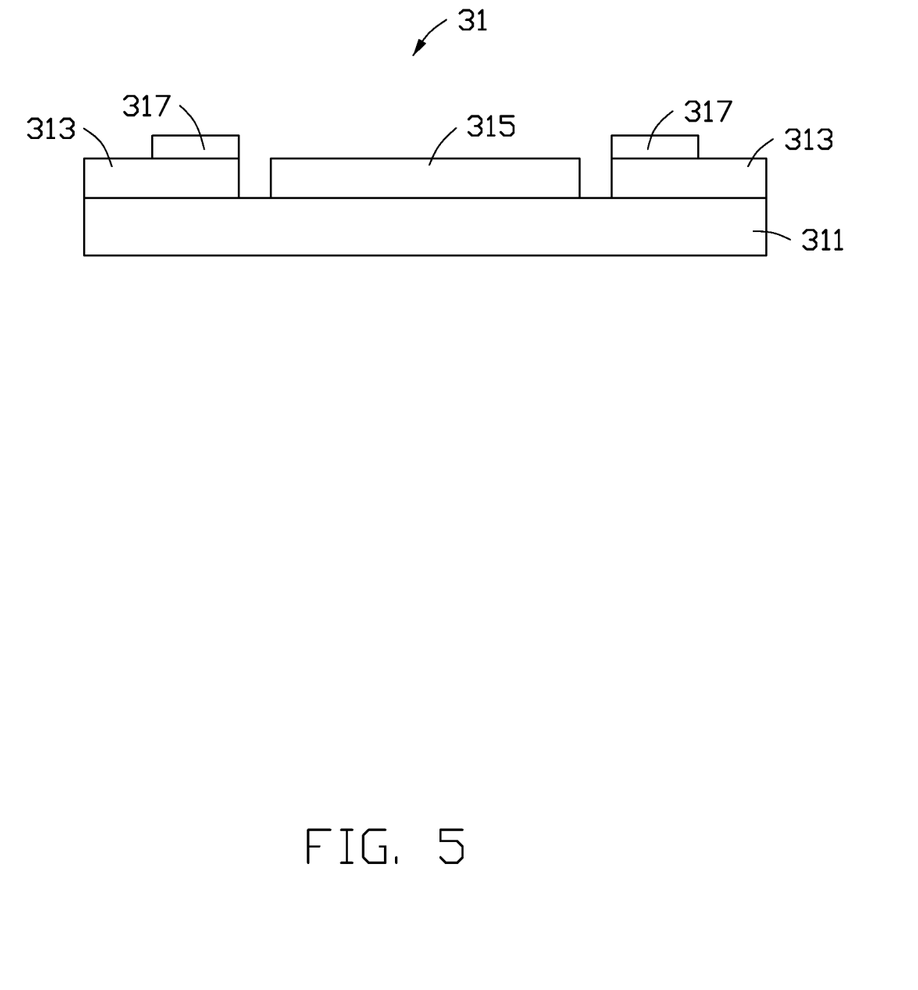
FIG. 5 is a planar view of the display units of FIG. 4 viewed from a side direction.

FIG. 4 shows the display units 31 in a planar view. FIG. 5 shows the display units 31 viewed in a side direction. Each display unit 31 includes a substrate 311, at least one micro light emitting diode (LED) unit 313, an optical sensor 315, and at least one first optical photoelectric conversion unit 317. In one embodiment, the substrate 311 is a printable structure on which a semiconductor element can be formed. The substrate 311 is made of transparent material or translucent material. In other embodiments, the substrate 311 can be made of materials such as plastic, glass, transparent metal, or sapphire.

Micro LED units 313 are located on the substrate 311. In one embodiment, each display unit 31 includes four micro LED units 313. The four micro LED units 313 are located on edges of the substrate 311. Specifically, the four micro LED units 313 are located on four corners of the substrate 311. In other embodiments, the number of micro LED units 313 in each display unit 31 may be adjusted due to different requirements, but not being limited.

Each micro LED unit 313 includes at least three LEDs. In one embodiment, there are three LEDs in each micro LED unit 313 spaced from each other. In other embodiments, the number of the LEDs may vary.

In one embodiment, the at least three LEDs are arranged in a line, in a rhombus shape, or in a diamond shape. Each LED has substantially a rectangular shape, and emits light straight out from the center. In one embodiment, each micro LED unit 313 emits light of three primary colors light. The micro LED unit 313 includes at least one micro LED 313R for emitting red light, at least one micro LED 313G for emitting green light, and at least one micro LED 313B for emitting blue light.

The micro LED unit 313 emits visible light based on the light of the three primary colors emitted by the micro LEDs, the color of the visible light is white. Thus, the display module 31 is able to provide display functionality based on the visible light of the micro LED units 313. The micro LED unit 313 of the display module 31 is able to emit non-visible light based on the filter controlling module 70, such as infrared light. The display module 31 can function as an infrared light source, and the infrared light is emitted into a retina of a human eye, thus, the micro LED unit 313 of the display module 31 is able to provide retinal scanning functionality. In one embodiment, the light emitted by the micro LED unit 313 includes about 90% non-visible light and about 5%-10% visible light.

Figure 6:
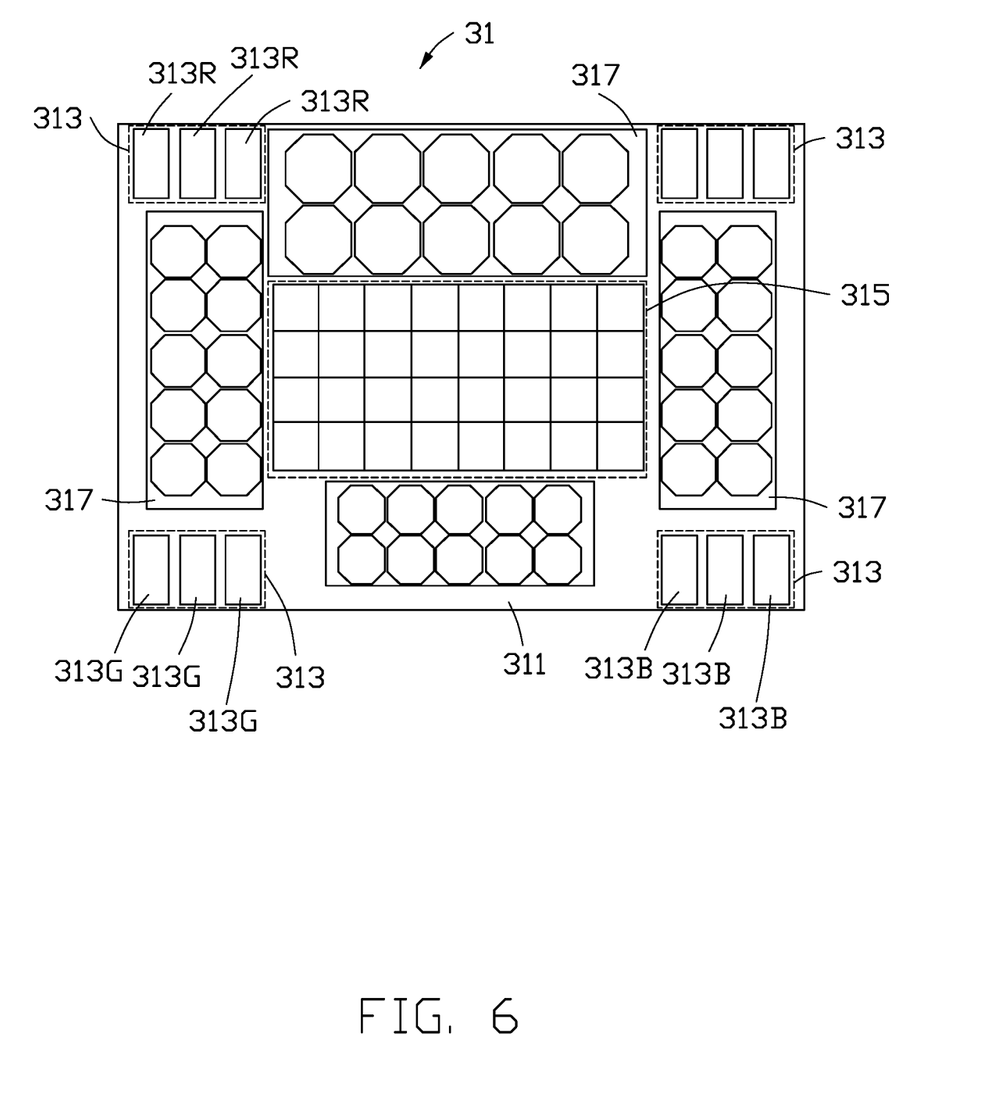
FIG. 6 is a planar view of a second embodiment of the display units of FIG. 3.

FIG. 6 shows a second embodiment of the micro LED unit 313. The micro LED unit 313 includes at least three LEDs. In one embodiment, there are three LEDs in each micro LED unit 313 spaced from each other. In other embodiments, the number of the LEDs in each micro LED unit 313 can be adjusted, but not being limited.

In one embodiment, the at least three LEDs are arranged in a line, or in a rhombus shape, or in a diamond shape. Each LED is substantially rectangular, and emits light straight out from the center. In one embodiment, the LEDs in each micro LED unit 313 emit light of the same color. The micro LED unit 313 in the upper left corner includes three LEDs 313R for emitting red primary light. The micro LED unit 313 in the lower left corner includes three LEDs 313G for emitting green primary light. The micro LED unit 313 in the lower right corner includes three LEDs 313B for emitting blue light.

The micro LED units 313 can emit light of three primary colors and such light can be mixed to form white light. Thus, the display module 31 is able to provide display functionality based on the visible light of the micro LED unit 313. The micro LED unit 313 of the display module 31 is able to emit non-visible light such as infrared based on the filter controlling module 70. The display module 31 can be an infrared light source, and the infrared light is emitted into a retina of at least a human eye, thus the micro LED unit 313 of the display module 31 is able to provide retinal scanning functionality. In one embodiment, the light emitted by the micro LED unit 313 includes about 90% non-visible light and about 5%-10% visible light.

The optical sensor 315 is located in a middle portion of the substrate 311, and is electrically connected to the processor 40 and the battery 50. In one embodiment, the optical sensor 315 is an infrared image sensor. When the micro LED unit 313 emits infrared light, and the optical sensor 315 forms an image from the infrared light reflected by human eyeball, thus positions and movement of the human eyeball can be recognized. In one embodiment, movements of the human eyeball include saccade, fixedness, smooth movement, and blinking, but not being limited.

The at least one first optical photoelectric conversion unit 317 converts solar energy into electrical power. In one embodiment, the at least one first optical photoelectric conversion unit 317 is a solar battery. The at least one first optical photoelectric conversion unit 317 is located on a region of the substrate which does not carry the micro LED 313 and the optical sensor 315. In one embodiment, each display module 31 includes four first optical photoelectric conversion units 317. Each first optical photoelectric conversion unit 317 is located between two adjacent micro LED units 313, and surrounds the optical sensor 315.

In one embodiment, in each display module 31, an area of one micro LED units 313 is less than 20% of a total area of the substrate 311. An area of the optical sensors 315 is equal to 30% of the total area of the substrate 311, an area of the first optical photoelectric conversion units 317 is equal to 50% of the total area of the substrate 311.

In one embodiment, the display module 31 is transparent. Thus, the lenses 20 remain in a transparent state when the display module 31 is fixed on the lenses 20, and vision of the wearer is not affected by the display module 31.

Referring to FIGS. 1 and 2 again, the processor 40 is disposed in the arms 13 of the frame structure 10. The processor 40 is electrically connected to the micro LED unit 313, the optical sensor 315, and the battery controlling module 60 for controlling operations of the display module 30, the battery controlling module 60, and the filter control module 70. In one embodiment, the processor 40 receives data from the optical sensor 315, and determines positions and movements of the human eyeball. The processor 40 further generates an operation instruction based on a relationship between various operation instructions as well as positions and movements of the human eyeball. For example, the display module 30 may display at least one home directory and a plurality of sub-directories below the home directory. When the human eyeball viewing a specified region is determined to be fixed, the processor 40 generates a selection instruction based on the fixed eyeball. When a blinking action of the human eyeball is determined, the processor 40 generates an instruction for returning to a previous directory from currently sub-directory. When a movement and a fixedness of the human eyeball are determined, the processor 40 further generates the selection instruction based on the final position of the human eyeball.

Figure 2:
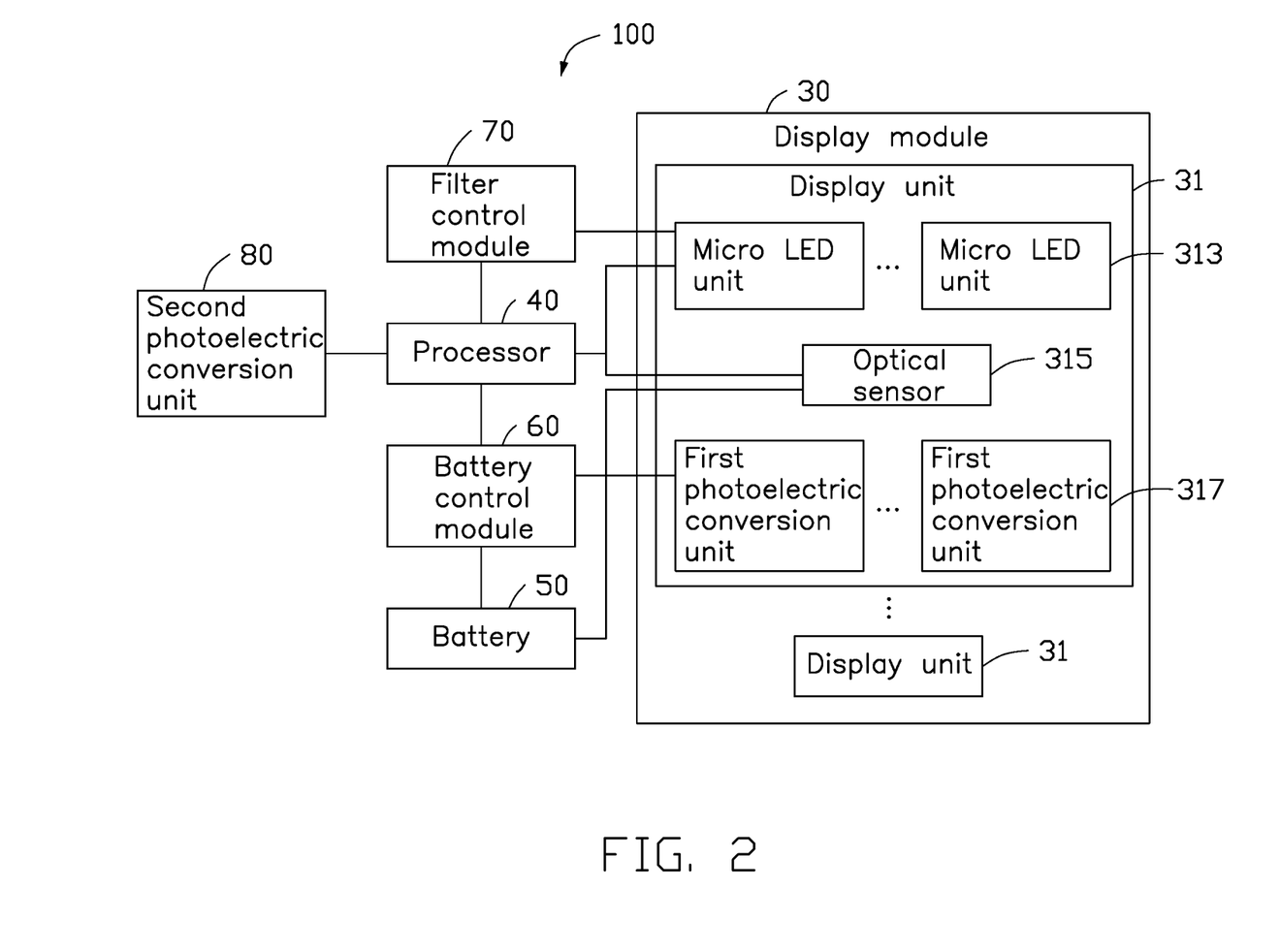
FIG. 2 is a diagram illustrating another embodiment of the smart glasses of FIG. 1.

In one embodiment, the battery 50 is a polymer colloidal battery or a graphite thin material battery. The battery 50 is disposed in the frame 11 of the frame structure 10. Specifically, the battery 50 provides power supply to the modules of the smart glasses 100.

The battery control module 60 is disposed in the arms 13 of the frame structure 10. The battery control module 60 is electrically connected to the at least one first optical photoelectric conversion unit 317 and the battery 50. The battery control module 60 stores the electrical power of the at least one first optical photoelectric conversion unit 317 in the battery 50.

The filter control module 70 is disposed in the arms 13 of the frame structure 10. The filter control module 70 is electrically connected to the processor 40 and the at least one micro LED unit 313. The filter control module 70 controls the micro LED module 313 to emit non-visible light under the control of the processor 40, such as the infrared light. Thus, the display module 31 is able to provide retinal scanning functionality.

In one embodiment, the processor 40 controls the micro LED units 313 of one of the display units 31 to display images, and controls the micro LED units 313 of an adjacent display unit 31 to emit the infrared light through the filter control module 70. The optical sensor 315 cooperates with the infrared light to execute the retinal scanning function.

In one embodiment, the processor 40 controls each micro LED unit 313 in each display module 31 to display images for a specified time duration, such as 1 millisecond, and then each micro LED unit 313 in each display module 31 to emit the infrared light. As such, the optical sensor 315 cooperates with the infrared light to execute the retinal scanning function.

In one embodiment, the smart glasses 100 further include at least one second optical photoelectric conversion unit 80. The at least one second optical photoelectric conversion unit 80 is electrically connected to the processor 40, and converts the solar energy into electrical power. In one embodiment, the at least one second optical photoelectric conversion unit 80 is a solar battery. The at least one second optical photoelectric conversion unit 80 is disposed in the frame 11 of the frame structure 10, and provides power to modules of the smart glasses 100.

The at least one first optical photoelectric conversion unit 317 is disposed in each display unit 31 of the smart glasses 100 for converting solar energy into the electrical power, and provides the electrical power to the battery 50 for storing. Thus, the smart glasses 100 convert the solar energy into the electrical power which is stored in the battery 50, and battery life of the smart glasses 100 is improved.

While various and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A smart glass comprising:
   a plurality of lenses;
   a frame structure connected to the plurality of lenses;
   a display module disposed in at least one of the plurality of lenses; the display module having a plurality of display units arranged in a matrix; each display unit comprising at least one micro LED unit, and at least one first optical photoelectric conversion unit for converting ambient or solar light into electric power;
   a battery disposed in the frame structure and electrically connected to the display module;
   and
   a processor electrically connected to the display module and the battery;
   wherein each display unit further comprises an optical sensor;
   wherein the smart glasses further comprises a filter control module; the filter control module is disposed in the frame structure, and is electrically connected to the processor; the processor controls the at least one micro LED unit in one of the display units to display images, and controls the at least one micro Led unit in the other display units to emit non-visible light through the filter control module, such that the micro LED unit can cooperate with the optical sensor to perform retinal scanning.

2. The smart glasses of claim 1, wherein each display unit further comprises an optical sensor; the optical sensor and the at least one micro LED unit are electrically connected to the processor.

3. The smart glasses of claim 2, wherein each display unit further comprises a substrate; the at least one micro LED unit is on an edge of the substrate; the optical sensor is on a middle portion of the substrate; the at least first optical photoelectric conversion unit is on a region of the substrate without the micro LED unit and the optical sensor.

4. The smart glasses of claim 3, wherein each display unit comprises four micro LED units and four first optical photoelectric conversion units; the four micro LED units are on four corners of the substrate; each first optical photoelectric conversion unit is between two adjacent micro LED units, and the micro LED units surround the optical sensor.

5. The smart glasses of claim 3, wherein an area of the at least one micro LED unit in each display unit is less than 20% of a total area of the substrate.

6. The smart glasses of claim 2, wherein the processor is disposed in the frame structure; the processor is electrically connected to the at least one micro LED unit of each display unit and the optical sensor; when a part of the at least one micro LED unit emits infrared light, the optical sensor receives reflected light from at least one human eyeball, and the processor determines positions of the human eyeball based on the reflected light.

7. The smart glasses of claim 1, wherein each display unit is transparent.

8. The smart glasses of claim 1, wherein the smart glasses further comprise a battery control module; the battery control module is electrically connected to the first optical photoelectric conversion unit and the battery; the battery control module controls the at least one first optical photoelectric conversion unit to store electrical power in the battery; the battery is a polymer colloidal battery or a graphite thin material battery.

9. The smart glasses of claim 1, wherein the smart glasses further comprise a second optical photoelectric conversion unit; the second optical photoelectric conversion unit is disposed in the frame structure, and converts solar energy into electrical power for powering the smart glasses.

10. A smart glasses comprises:
    a plurality of lenses;
    a frame structure connected to the plurality of lenses;
    a display module disposed in at least one of the plurality of lenses; the display module having a plurality of display units arranged in a matrix; each display unit comprising at least one micro LED unit, and at least one first optical photoelectric conversion unit for converting ambient or solar light into electric power;
    a battery disposed in the frame structure and electrically connected to the display module;
    and
    a processor electrically connected to the display module and the battery;
    wherein each display unit further comprises optical sensor;
    wherein the smart glasses further comprises a filter control module; the filter control module is disposed in the frame structure, and is electrically connected to the processor; the processor controls a part of the at least one micro LED unit in each display unit to display images, and controls the rest of the at least one micro LED unit in each display unit to emit non-visible light through the filter control module, such that the micro LED unit can cooperate with the optical sensor to perform retinal scanning.

11. The smart glasses of claim 10, wherein the light emitted by the micro LED unit comprises about 90% non-visible light and about 5%-10% visible light.

12. A smart glasses comprises:
    a plurality of lenses;
    a frame structure connected to the plurality of lenses;
    a display module disposed in at least one of the plurality of lenses; the display module having a plurality of display units arranged in a matrix; each display unit comprising at least one micro LED unit, and at least one first optical photoelectric conversion unit for converting ambient or solar light into electric power;
    a battery disposed in the frame structure and electrically connected to the display module;
    and
    a processor electrically connected to the display module and the battery;

wherein each display unit further comprises an optical sensor;

wherein the smart glasses further comprises a filter control module; the filter control module is disposed in the frame structure, and is electrically connected to the processor; the processor controls the at least one micro LED unit in each display unit to display images for a specified time duration, and controls the at least one micro LED unit in each display unit to emit non-visible light through the filter control module, such that the micro LED unit can cooperate with the optical sensor to perform retinal scanning.

* * * * *